Figure 1:
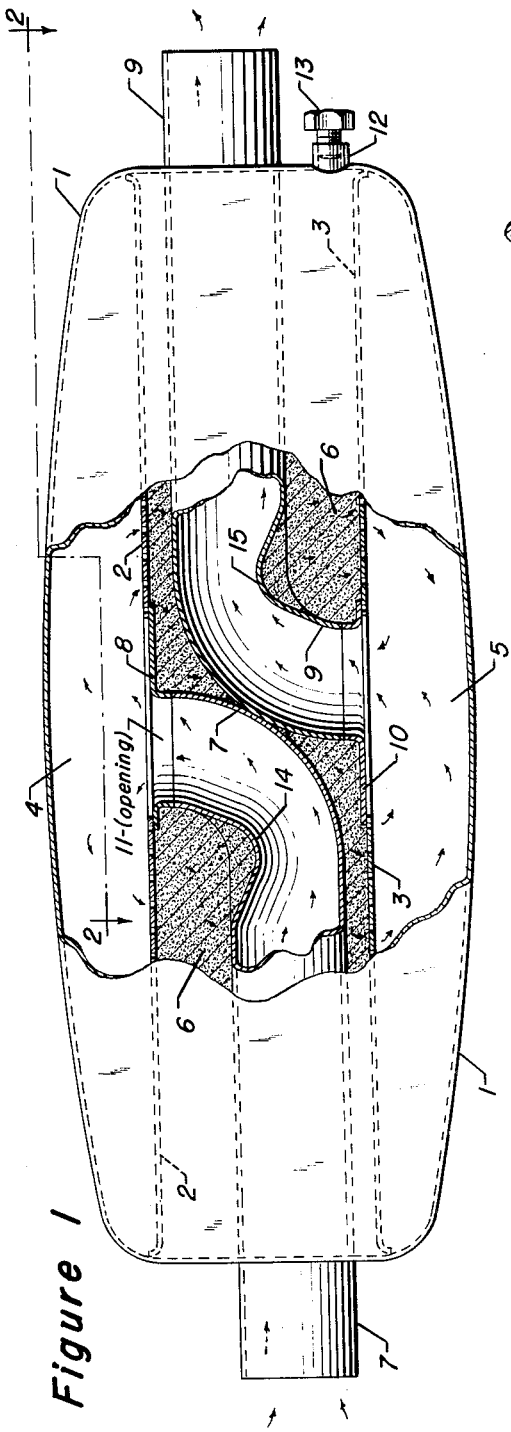

Dec. 11, 1962    F. V. PURSE ETAL    3,068,079
APPARATUS FOR THE CONVERSION OF EXHAUST GASES
Filed May 5, 1960

INVENTORS:
Frank V. Purse
Curtis F. Gerald
BY:
Chester J. Giuliani
Philip T. Liggett
ATTORNEYS

United States Patent Office 3,068,079
Patented Dec. 11, 1962

3,068,079
APPARATUS FOR THE CONVERSION OF
EXHAUST GASES
Frank V. Purse, Skokie, and Curtis F. Gerald, Lake Zurich, Ill., assignors to Universal Oil Products Company, Des Plaines, Ill., a corporation of Delaware
Filed May 5, 1960, Ser. No. 27,201
7 Claims. (Cl. 23—288)

This invention relates to an improved apparatus for the conversion of waste gases and more particularly, to a combination converter and muffler suitable for use with exhaust gases from internal combustion engines as employed in automobiles, trucks and other vehicles. The improved apparatus of the present invention is also particularly adapted to serve as a catalytic converter by providing means to retain a bed of catalytic material therein which will aid in the efficient treatment and purification of the exhaust gas stream.

In connection with waste product streams, such as exhaust gas streams from automotive engines, there are various harmful noxious components which should be treated prior to discharge to the atmosphere. Such exhaust gases contain one or more components as unburned hydrocarbons, carbon monoxide, nitrogen oxides, sulfur compounds, partially oxidized products, etc., in various concentrations, and part or all of these components are believed to contribute to the smog problem presently facing various geographical areas of the United States and other countries. It is believed that these combustion products react with oxygen under the influence of sunlight to produce smog.

In order to overcome the problems of smog and of atmospheric contamination, it has been proposed to use afterburners or catalytic devices in the exhaust gas systems of vehicles. The use of a catalytic device such as a combination converter-muffler, provides a desirable means for aiding and enhancing the oxidation of various of the incompletely oxidized components of the exhaust gas streams from motor vehicles and is generally considered to be the preferable way of purifying such exhaust gas streams. In the catalytic operation, the hot gases issuing from the motor exhaust manifold are mixed with a quantity of secondary or combustion air and the resulting mixture passed through a catalyst bed maintained within a conversion zone so as to effect a more or less complete oxidation of the carbon monoxide and unburned hydrocarbons present in the exhaust stream. The use of a catalytic method also provides the initiation of the oxidation reaction at lower temperatures than might otherwise be possible, and effectively eliminates the need for igniting means which is generally used with most types of "afterburners," or other apparatus which depend strictly upon thermal conversion conditions.

A preferred form of exhaust gas conversion apparatus embodies a design and construction which provides for the internal placement or positioning of a catalyst bed such that it may be utilized in an efficient manner and to the maximum degree. Improved forms of catalysts now available are able to retain their catalytic efficiency for long periods of operation, for perhaps the entire life of a converter or muffler, in which case no particular provision need be provided for the removal of contaminated catalyst, however, preferably, means may be provided for readily removing the used catalyst and for adding fresh catalyst. The converter apparatus should also be designed, with respect to structural and mechanical details, to withstand temperature stresses which may be induced by relatively large thermal gradients within different portions of the apparatus. High temperatures, substantially in excess of those encountered in conventional automobile mufflers, may be produced as a result of exothermic oxidation reactions taking place within the zone of the catalyst bed, and depending upon the particular catalytic material employed, temperatures may run well above 1200° F. and up to the order of 1800° F. The operation of the particular vehicle, as to whether it is being operated under conditions of idle, acceleration, cruising, or deceleration, will provide variations in the internal temperature of the converter. It is desirable to have the construction of the various components of the converter of relatively light gauge sheet metal such that the weight of the converter and muffler will not be excessive, and such that there may be movement and expansion without effecting rupture or splitting of joints and seams. Structural and physical arrangement of the various sections of the converter-muffler should also provide that there may be contained therein an adequate volume of catalyst, as well as means for effecting the uniform distribution of the gas stream to be converted over and through the entire volume or bed of the catalytic material. It is, of course, also necessary that the arrangement of the catalyst bed, or of a packing material which may be utilized in combination with the catalytic material, be such as to aid in effecting the desired acoustical muffling of the exhaust gas stream being admitted from the internal combustion engine.

It is also important that a desired form of the converter have a design and arrangement providing for minimizing the pressure drop through the entire converter so as to hold down to a low value the overall pressure drop through the exhaust system of the vehicle. It is necessary that there be a limited back pressure on the exhaust manifold of the vehicle engine in order that the efficiency of the engine be not impaired. Conventional present day non-catalytic mufflers provide a pressure drop of the order of 3 to 7 pounds per square inch at high engine speeds and it is desirable that converters utilizing catalytic agents therein provide a pressure drop no greater than the conventional types of mufflers. The minimizing of pressure drop factors through the converter system also has the desirable effect of letting the catalyst bed provide the major pressure drop through the apparatus, which in turn brings about the desirable aspect of causing the exhaust gas stream to be generally more uniformly distributed over and through the entire catalyst bed as it is passed through the converter.

It is thus a principal object of the present invention to provide a converter for exhaust gas streams which is designed to provide efficient utilization of a solid contact material aiding in the conversion and purification of the exhaust gas stream.

It is a further object of the present invention to provide a desirable combination of construction and design features which have the effect of reducing to a minimum amount the pressure drop of the exhaust gas stream as it is brought into the converter and discharged therefrom, such that there is a resulting major portion of the overall pressure drop effected by the contact material or bed which is incorporated internally within the converter.

Briefly, the present improved apparatus suitable for effecting the contact of a fluid stream with solid particles while reducing turbulence and pressure drop for the fluid flow therethrough, comprises in combination, a confined chamber having spaced perforate members extending across the interior thereof and adapted to retain a bed of subdivided solid particles therebetween, said spaced plates further defining separated fluid inlet and outlet sections within said chamber, a fluid inlet passageway extending into said chamber between said perforate members and discharging through an elbow of varying cross-sectional area which diverges to a flared outlet being directed toward and communicating with the inlet section, and a fluid outlet passageway extending from within the chamber and from between the perforate members for the discharge of the fluid stream, with said outlet passageway having an elbow portion which in turn is directed towards and communicates with the outlet section of the chamber.

A preferred form of the apparatus may have both the inlet and outlet passageway elbows provided with flared elbow portions to aid in obtaining stream-lined flow therethrough. Also, a preferred embodiment of the apparatus is provided with an area reducing means in at least the inlet elbow portion of the inlet passageway to decrease fluid turbulence therein.

Various means may be utilized for effecting an area reduction or area restriction within the elbow section of the fluid passageways. For example, a deformation may be formed by pressure from a die of the proper shape or contour, or insertion means may be suitably fabricated and mounted therein to effect a cross-sectional area reduction. The preferred form of the construction of the improved apparatus of this invention, as will hereinafter be more fully set forth, provides an insert, or area reducing means, which is positioned only along the inside curved portion of the elbow of the inlet passageway feeding into the inlet section, and similarly, in some instances, along only the inside curved portion of the outlet passageway connecting with the outlet section.

It is also a feature of a preferred embodiment of the apparatus to have flared sections between the inlet and outlet passageways at, respectively, the inlet and outlet sections of the apparatus, to further reduce pressure drop and turbulence in exhaust stream flow. More specifically, it has been found desirable to have an oval-shaped flared portion to each opening which provides that the long diameter of the oval is transverse with respect to the longitudinal axis of the inlet and outlet passageways. These oval-shaped inlet and outlet portions not only reduce the pressure drop, but they also tend to better distribute, or collect, the gas stream flow. For example, in connection with the inlet section, the resulting fluid flow is directed at right angles to the directional discharge of the gas stream into the inlet section and there is provided a resulting desirable uniform distribution of the gas stream through the contact bed.

Reference to the accompanying drawing and the following description thereof will serve to help clarify the improved construction and features provided by the present invention.

FIGURE 1 of the drawing is a diagrammatic sectional elevational view of one embodiment of the converter-muffler which is particularly adapted to purify exhaust gases.

Figure 2:
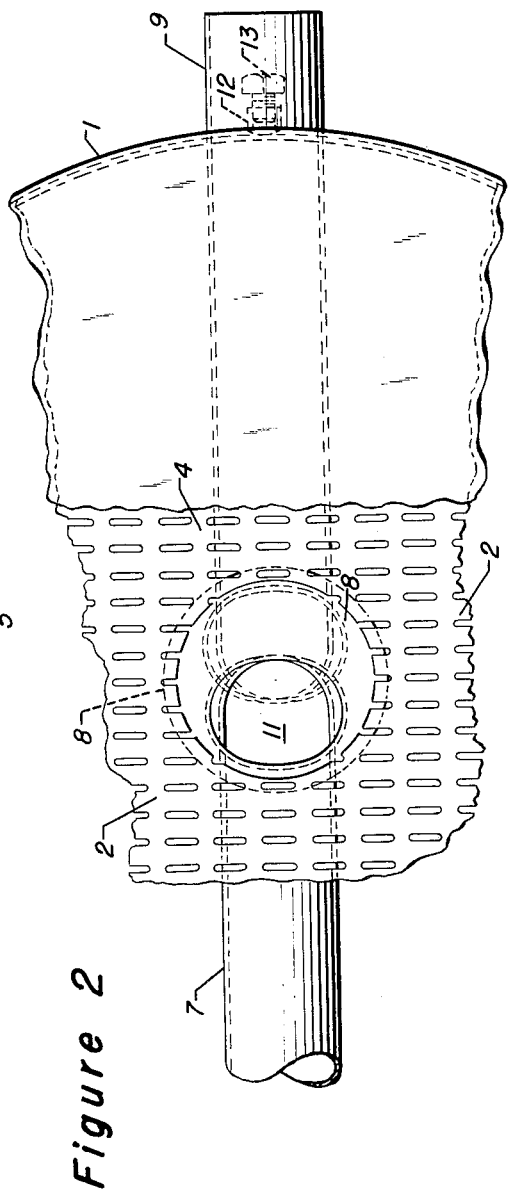

FIGURE 2 of the drawing is a partial sectional plan view of the apparatus, as indicated by the line 2—2 in FIGURE 1 of the drawing.

Referring now specifically to the drawing, there is shown a chamber 1 which may have a generally round or disc-like shape and which is constructed to be pressure-tight. The chamber may be actually fabricated from several sections or pieces and may be hexagonal, octagonal, etc. in shape if so desired, however, in its assembly, various joints should be suitably welded, or joined with the use of gaskets and bolts in a manner to be substantially leak-proof for the exhaust gas flow to be accommodated therein. The interior of the chamber 1 is partitioned by suitable perforate plates 2 and 3 which are spaced from one another and from the upper and lower heads of the chamber in a manner providing an inlet header section 4, an outlet header section 5 and a catalyst or packed bed section 6. Partitioning plates 2 and 3 are welded or otherwise attached and sealed around their peripheral connections with the outer wall of the chamber 1, so as to insure gas flow through the perforations rather than around any edges thereof. The present drawing does not indicate any spacers or stiffening ribs with respect to the partitioning plates 2 and 3 and with respect to the upper and lower heads of the chamber 1, however, suitable spaced stiffeners and spacer members are placed between the perforate plates and between the heads of the chamber to maintain proper positioning thereof, as well as to resist buckling and deformation when in use. As previously pointed out, it is desirable that the walls of the chamber and the partitioning members be of lightweight or relatively thin gauge material, whether of ordinary steel or of alloy, such that the assembly is relatively lightweight and such that temperature effects may be accommodated by flexure and without causing breakage of seams and joints.

Inlet conduit 7 is indicated as projecting externally from the wall of the chamber 1 for a distance suitable to connect with an exhaust manifold pipe, while extending internally therein between the partitioning plates 2 and 3 to approximately the center portion of the converter apparatus. The inner end of inlet pipe 7 makes a 90° turn upwardly to discharge through an opening in the central portion of partitioning plate 2, providing gas flow into the inlet header section 4. In the present embodiment, a transition piece 8 is provided between the plate 2 and the inside end, or elbow portion, of inlet conduit 7. In a similar construction, an outlet conduit 9 is provided to extend externally of the chamber for a short distance, as well as internally between plates 2 and 3, and has an elbow-shaped end section which communicates with the outlet header section 5. The present embodiment also provides a transition piece 10 between the central open portion of plate 3 and the end or elbow portion of the outlet conduit 9.

In a preferable arrangement, the inlet and outlet conduits 7 and 9, respectively, have a round cross-section to provide a desirable streamlined gas flow therethrough, however, as is best shown in FIGURE 2, in connection with the inlet conduit 7, the transition piece 8 flares from a round or circular shape to a flared oval-shaped outlet 11 discharging into the inlet header section 4. Similarly, the outlet conduit 9 has a round pipe-like shape, but at the inlet thereof, the transition piece 10 provides an oval-shaped opening at the communication with the outlet section 5.

The present construction maintains the longitudinal axis of both the inlet and outlet conduits 7 and 9 in one plane. It is also a desirable feature of a preferred construction to provide connection between conduits 7 and 9, at the center of the converter, by joining the outer surfaces of the elbows, whereby the conduit sections maintain a certain degree of structural rigidity longitudinally through the entire converter. It is not intended to limit the positioning of a converter of this type, however, in connection with its use with automobile exhaust gas streams, where catalytic purification is being undertaken, it is preferable that the apparatus be mounted substantially as shown in FIGURE 1 of the drawing with respect to top and bottom portions. In other words, the disc-shaped chamber should be mounted to have the large dimension extend horizontally with respect to the vehicle and such that the exhaust gas line connecting with the inlet conduit 7 discharges upwardly into a top gas distributing section 4 whereby there is a resulting downflow through the perforated plate 2 and through the contact material or catalyst in section 6. The header section 5 is thus on the lower end and acts as a gas collecting chamber to discharge through outlet conduit 9. This preferred position, maintaining a downward gas flow, precludes any fluidization of the packing or catalyst particles utilized in bed 6, between perforate plates 2 and 3, with an accompanying minimization of attrition of such material.

Where the apparatus operates as a catalytic converter, effecting the purification of the exhaust gas stream prior to its discharge to the atmosphere, the material maintained within the packed bed 6 is a suitable oxidation catalyst which, in turn, is preferably in a pellet-like form, having a major dimension from 1/16" to 1/4". The size may be chosen to correlate with the size of the perforations in the plates 2 and 3, or to provide improved catalytic effect. The physical shape of the catalyst, however, may vary with manufacturing procedures and may be in the form of spheres, cylinders, cubes and the like. The openings in the plates 2 and 3 may be circular punchings, elongated slots, louvers, and the like. In some cases screening or mesh-like materials, suitably stiffened or reinforced may be utilized in lieu of perforated sheet metal pieces. In any case, it is desirable that the material used be able to withstand high temperature conditions since normal operating temperatures in connection with automotive exhaust gas streams may be of the order of 1200° F., and as high as 1800° F., depending upon the particular operating phase of the automotive engine. A suitable opening or nozzle 12, with a removable plug 13, may be provided through the wall of the chamber 1 to communicate with the interior of the packed section 6, whereby catalyst or other contact material may be readily added to and removed from the apparatus.

It is, of course, not intended to limit the present invention to the use of any one type of catalytic material, for various catalytic agents are presently being used and undergoing further study and research to obtain efficient exhaust gas conversion. Also, when the converter is to act thermally, various high temperature-resistant packing materials may be utilized in lieu of catalyst. Such other materials may comprise metal packings of one type or another, ceramic materials, refractories, or in some cases, standard forms of ring packing, like Raschig rings, spiral partition rings, Berl saddles and the like. It is, of course, desirable that the packing material provide a muffling action to the noise caused by the high velocity exhaust gas stream through an unbaffled chamber. Combinations of one or more catalysts, or of a catalyst and a packing, may also be employed in the device. Although not shown in the drawing, the exterior of the chamber 1 may be covered, in whole or in part, with a layer of suitable insulating material to conserve heat in the catalyst bed and/or to protect adjacent equipment in a vehicular installation.

It is a desirable construction and design feature of a packed converter of this type to have a varying cross-sectional area gas distributing header communicating with the packed bed. Thus, as illustrated in FIGURE 1 of the drawing, it is desirable to have the upper and lower heads of chamber 1 convex with respect to flat plates 2 and 3, when the exhaust gas stream discharges from the conduit 7 into a central portion of section 4, with a resulting radial flow outwardly from the central portion of the chamber to the periphery thereof, there is a decreasing space to, in turn, accommodate a decreasing volume of gas flow as the gas stream changes its direction and passes downwardly through the contact bed 6. This design and flow encourages uniform gas distribution through the entire area of the bed 6 and minimizes the transition of the "velocity head" gas flow to "pressure head" in effecting the gas-solids contact. In the reverse manner, the cross-section of the outlet manifold space 5 increases from the outer peripheral portions of the chamber toward the central portion such that as the gas flow or gas volume increases with decreasing radii toward the centrally positioned transition piece 10 and outlet conduit 9. This increased space provides greater volume for the increased gas flow approaching the outlet conduit 9, all of which helps to minimize the transition from "pressure head" to "velocity head." As will hereinafter be brought out, the flared transition portions between conduits and header section also decrease turbulence in the gas flow and provide a decreased pressure drop through the chamber.

In accordance with a particular feature of the present invention, a projection or area restriction means positioned along the inside curve of each of the elbow sections, such as provided by the projected wall sections 14 and 15 within, respectively, conduits 7 and 9, effect substantial reduction in pressure drop for the gas flow through the conduits. It is not intended to limit the manner in which the projections 14 and 15 are placed or formed along the inside curved portions of the conduits since they may be formed directly in the wall by a die-forming operation, or alternatively, they may be provided by suitable separate inserts welded or otherwise attached in the proper position along the inner curved portions of the pipes. The projections 14 and 15 cause a reduction in the cross-sectional area at the zone of the inlet to the curved sections of the conduit in the manner of a partial venturi. However, the area reducing pieces, not being entirely circumferential around the wall of the conduits, do not provide a true venturi type of cross-section and are more advantageous in reducing flow stream turbulence and in turn, reducing pressure drop for the gas flow through the entire apparatus. In the case of the inlet conduit, it has been found that the projection should only extend along the upper inside shorter curved portion of the inlet conduit, while in connection with the outlet conduit 9, it was found preferable to place the restriction only along the lower curved portion of the outlet conduit 9 in a manner which is substantially symmetrical with the positioning of the restriction on the inlet conduit. These area reducing means together with the flared openings communicating with the inlet and collecting header sections 4 and 5 respectively, serve to materially reduce the pressure drop through the mechanical passageway portions of the converter and result in the desired major pressure drop being taken through the packed bed 6 between the perforated plates 2 and 3.

A further construction feature which aids in effecting the desired uniform gas flow through the system is obtained by utilizing elongated slot-like perforations within plates 2 and 3, with such slots having their greatest length extending transverse to the longitudinal axis of the inlet and outlet conduits 7 and 9. Thus, if gas flow is distributed from conduit 7 through the oval-shaped opening 11, there is a tendency for such stream flow to be initially thrust to the two sides of the converter chamber, at right angles to and away from the direction of flow through the conduits, while at the same time being subjected to a reversal in flow by reason of impinging against the top head of the chamber itself. Slotted openings extending transversely across the chamber are also transverse with respect to the line of flow of the initial introduction of the gas stream into the header section. The bottom plate 3 may likewise be provided with slotted openings in the same manner of construction as the upper plate 2, however, the shape of the openings in the bottom plate are believed to have less importance than in connection with those in the plate through which the stream initially is introduced into the catalyst bed.

The test data provided in the following examples show the benefits of certain of the design features of the improved apparatus.

*Example 1*

A length of 2 1/4" I.D. pipe, bent into a 90° elbow at its discharge end, was connected to an air supply and mounted in a position to either have a free discharge to the atmosphere or to discharge against a substantially flat plate which was spaced one inch from the opening. With air supplied through the pipe at varying flow rates of from 100 to 400 pounds per hour, the following pressures, measured in inches of water, were recorded in the pipe at a point approximately 3 feet upstream from the zone of the outlet elbow:

| #/Hr. | Free Discharge | Discharge against plate |
|---|---|---|
| 100 | 0.095 | 0.130 |
| 140 | 0.175 | 0.240 |
| 200 | 0.360 | 0.495 |
| 280 | 0.700 | 0.955 |
| 400 | 1.470 | 2.020 |

*Example II*

With the same pipe utilized in connection with Example I, except that a flared or oval-shaped outlet was provided at the end of the elbow, tapering from 2¼" I.D. of the pipe to 2¾" along the long axis of the oval, the following pressures were measured at the zone of measurement.

| #/Hr. | Free Discharge | Discharge against plate |
|---|---|---|
| 100 | 0.090 | 0.100 |
| 140 | 0.175 | 0.190 |
| 200 | 0.360 | 0.390 |
| 280 | 0.675 | 0.740 |
| 400 | 1.460 | 1.620 |

*Example III*

With the same 2¼" I.D. pipe used in Example I (without a flared outlet section), an insert was placed in the elbow portion of the pipe to cause a cross-sectional area reduction in the flow path. The insert was in the form of a hump and was approximately two inches long, one and one-half inches wide and about three-fourth inches in depth, and was positioned along the inside short curved portion of the bend in the elbow, corresponding closely to the positioning of the projection 14 in pipe 7 of FIGURE 1 of the drawing. With varying flow rates, the following pressures were recorded.

| #/Hr. | Free Discharge to Atmosphere | Discharge against a flat plate—1" away from elbow |
|---|---|---|
| 100 | 0.075 | 0.95 |
| 140 | 0.135 | 0.175 |
| 200 | 0.255 | 0.340 |
| 280 | 0.480 | 0.625 |
| 400 | 1.000 | 1.305 |

*Example IV*

The same sized pipe with an insert in the elbow as described in Example III, and varying flared or oval-shaped outlet openings, namely 2¼" x 2½", 2¼" x 2⅝" and 2¼" x 2¾", were used in this instance. With varying flow rates the following pressure readings were obtained.

| #/Hr. | 2¼" Dia. Circular | | Oval 2¼ x 2½ | | Oval 2¼ x 2⅝ | | Oval 2¼ x 2¾ | |
|---|---|---|---|---|---|---|---|---|
|  | (*) | (**) | (*) | (**) | (*) | (**) | (*) | (**) |
| 100 | 0.075 | 0.095 | 0.080 | 0.085 | 0.070 | 0.075 | .070 | 0.070+ |
| 140 | 0.135 | .175 | .145 | 0.155 | .130 | .140 | .130 | 0.135 |
| 200 | .250 | .355 | .265 | .295 | .240 | .265 | .240 | 0.250 |
| 280 | .475 | .640 | .495 | .555 | .440 | .490 | .440 | .465 |
| 400 | 1.000 | 1.300 | 1.030 | 1.150 | .900 | 1.010 | .900 | .970 |

*Flowing free.
**Flowing against a plate spaced 1" from the elbow.

Comparison of the data from the varying experiments show clearly that both the flared outlets and the insert means in the inside curve of the elbow have a definite effect in reducing pressure drop for varying flow rates of gas through the conduits. For example, compare the reading of 2.020 for 400 #/hr. when a conventional pipe and elbow is used, and the reading of 1.305, where the insert is used. The reduction is equal to .705 (inches of water) or 35.4% reduction in back pressure.

Where both a 2¼" x 2¾" flare and insert means were employed in connection with the 2¼" I.D. pipe and its discharge elbow there was a reduction from the reading of 2.020 (at 400 #/hr.) to 0.970. This provided a total reduction in pressure of 1.050 (inches of water) or of 52%.

We claim as our invention:

1. A fluid-solids contacting apparatus providing reduced turbulence and pressure drop for fluid flow therethrough, comprising a closed chamber having a side wall and oppositely disposed end walls, a pair of spaced parallel perforated partitions extending across the interior of the chamber and sealed around their peripheries to said side wall to form within the chamber a contacting section adapted to retain a bed of solid material, each of said partitions being spaced from one of said end walls of the chamber to form with the last-named walls separate fluid inlet and outlet sections on opposite sides of said contacting section, a fluid inlet conduit extending through said side wall into said contacting section and terminating adjacent the central portion of the chamber in a 90° bend communicating with said inlet section through one of said partitions, said 90° bend having a restricted cross-sectional area near its inlet end and a flared outlet end discharging into said inlet section of the chamber, and a fluid outlet conduit extending through said side wall into said contacting section and terminating adjacent the central portion of the chamber in a 90° bend communicating with said outlet section through the other of said partitions.

2. The apparatus of claim 1 further characterized in that said 90° bend has a hump-like cross-sectional area reducing means positioned along the inside curved portion thereof.

3. A fluid-solids contacting apparatus providing reduced turbulence and pressure drop for fluid flow therethrough, comprising a closed chamber having a side wall and oppositely disposed end walls, a pair of spaced parallel perforated partitions extending across the interior of the chamber and sealed around their peripheries to said side wall to form within the chamber a contacting section adapted to retain a bed of solid material, each of said partitions being spaced from one of said end walls of the chamber to form with the last-named walls separate fluid inlet and outlet sections on opposite sides of said contacting section, a fluid inlet conduit extending through said side wall into said contacting section and terminating adjacent the central portion of the chamber in a 90° bend communicating with said inlet section through one of said partitions, said 90° bend having a restricted cross-sectional area near its inlet end and a flared outlet end discharging into said inlet section of the chamber, and a fluid outlet conduit extending through said side wall into said contacting section and terminating adjacent the central portion of the chamber in a 90° bend communicating with said outlet section through the other of said partitions, the last-mentioned 90° bend having a restricted cross-sectional area near the end thereof connected to said outlet conduit and a flared inlet end communicating with said outlet section of the chamber.

4. The apparatus of claim 3 further characterized in that each of said 90° bends has hump-like area reducing means along the inside curved portion thereof.

5. The apparatus of claim 3 further characterized in that said flared inlet and outlet ends of said 90° bends are of an oval shape having the longitudinal axis thereof transverse with respect to the longitudinal axes of the inlet and outlet conduits.

6. The apparatus of claim 3 further characterized in that said chamber is of disc-like contour, said oppositely disposed end walls being convex with respect to said perforated partitions and said 90° bends being joined together.

7. The apparatus of claim 1 further characterized in that said partitions are provided with elongated slot-like perforations having their greatest length extending transverse to the longitudinal axis of the inlet and outlet conduits.

References Cited in the file of this patent

UNITED STATES PATENTS

| | | |
|---|---|---|
| 1,761,471 | Förstel | June 3, 1930 |
| 2,071,119 | Harger | Feb. 16, 1937 |
| 2,409,825 | Baringholtz | Oct. 22, 1946 |
| 2,928,492 | Nelson | Mar. 15, 1960 |